United States Patent [19]

Sercel

[11] Patent Number: 4,977,749
[45] Date of Patent: Dec. 18, 1990

[54] APPARATUS AND METHOD FOR PURIFICATION OF GASES USED IN EXCIPLEX (EXCIMER) LASERS

[76] Inventor: Jeffrey P. Sercel, 61 Nagle St., Nashua, N.H. 03060

[21] Appl. No.: 343,539

[22] Filed: Apr. 25, 1989

[51] Int. Cl.$^5$ .............................................. F25B 19/00
[52] U.S. Cl. .......................................... 62/51.1; 55/71; 62/55.5; 372/57; 372/59
[58] Field of Search .................. 62/51.1, 55.5; 372/57, 372/59; 55/71

[56] References Cited

U.S. PATENT DOCUMENTS

| | | | |
|---|---|---|---|
| 2,512,040 | 6/1950 | Slobod | 62/55.5 |
| 2,818,656 | 1/1958 | Holleman | 62/55.5 |
| 2,949,015 | 8/1960 | Fite | 62/55.5 |
| 3,721,100 | 3/1973 | Bovio | 62/55.5 |
| 4,302,950 | 12/1981 | Sitte | 62/51.1 |
| 4,317,087 | 2/1982 | Sander et al. | 372/59 |
| 4,571,954 | 2/1986 | Roberts et al. | 62/51.1 |
| 4,755,201 | 7/1988 | Eschwey et al. | 62/55.5 |

Primary Examiner—Ronald C. Capossela
Attorney, Agent, or Firm—Samuels, Gauthier & Stevens

[57] ABSTRACT

A system and method for the purification of laser gases having impurities therein. The pressure on the liquid nitrogen in a Dewar vessel controls the boiling point of the liquid nitrogen. The laser gas to be purified flows into heat exchange relationship with the liquid nitrogen at a temperature above the liquification temperature of the laser gas but below the liquification temperature of the impurities. The impurities are precipitated and removed and the laser gas recycled for further use.

8 Claims, 1 Drawing Sheet

APPARATUS AND METHOD FOR PURIFICATION OF GASES USED IN EXCIPLEX (EXCIMER) LASERS

BACKGROUND AND BRIEF SUMMARY OF THE INVENTION

Rare gas halide excimer lasers are high-pressure gas lasers which utilize halogens such as fluorene and chlorine in small concentrations.

Halogens are chemically reactive gases and the energy, which results from the laser discharge circuit, effects undesirable reactions resulting in the formation of impurities. These impurities absorb the laser light generated within the laser cavity, causing loss of laser emission. These impurities can also cause degradation of the discharge itself, reducing laser efficiency and component lifetime.

Other impurities can be introduced by opening the laser to ambient air whereby water vapor is absorbed into the laser vessel and other internal components, impurities inherent in the laser supply gases or the gas handling system and from reactions based on the materials of construction of the laser itself.

Cyrogenic liquid nitrogen trapping is a widely accepted method of purification of the gases used in excimer lasers. The excimer laser gas is pumped from the laser head into a cold trap. Within the cold trap, the laser gas is purified by freezing the impurities and then filtering the frozen impurities. The temperature of the cold trap must be held at a temperature low enough to freeze out the volatile impurities but not so low as to tend to liquify the laser gases. Gases, such as argon fluoride which lases at 193 nm and krypton fluoride which lases at 248 nm, benefit greatly from the removal of impurities. These laser gases require cold trap temperatures which are above the liquid nitrogen temperature (at atmospheric pressure) to avoid condensing out of the rare gases. Other laser gas mixtures, such as xenon chloride which lases at 308 nm, require temperatures well above the 77K temperature of liquid nitrogen to avoid liquifying both the rare gas and the halogen.

Prior art devices use atmospheric liquid nitrogen to cool the cold trap device. These cold traps have been found to work well with argon fluoride because the resulting temperatures of the cold trap maintain an argon vapor pressure adequate for lasing. For use with other lasing gases such as krypton fluoride or xenon chloride, a thermal impedence is placed between the liquid nitrogen and the cold trap. Further, an electronic temperature controller is used to control a heating element to stabilize the temperature at an elevated level.

These devices require frequent replenishment of the liquid nitrogen typically from a large storage Dewar.

The large storate Dewar is usually pressured to 20 to 230 psi. When the liquid nitrogen from the storatge Dewar is transferred to the cold trap, losses due to flashing can be considerable. Further, the frequent handling and filling requirements are quite inconvenient, inefficient and unreliable for industrial use. A further drawback to the cold trap is the low thermal insulating efficiency of the liquid nitrogen reservoir in the cold trap.

The art has also suggested a thermal mechanical refrigerator to cool the cold trap. This method has a high monitary cost associated with the refrigeration unit and complex designs to achieve insulation.

The present invention overcomes the drawbacks of the prior art devices by using a pressurized Dewar together with a regenerative heat exchange system. The storage portion of the Dewar is pressurized whereby the temperature of the liquid nitrogen can be controlled. The large liquid nitrogen volume of the device limits the amount of fill intervals thereby lowering flash loss.

Thus, the advantages of my invention are lengthening the time that a laser system can run unattended by reducing the number of liquid nitrogen fills from many times a day to one to two, or less than one time per week. The need for a large storage vessel near the laser system is not necessary and there is a resultant reduction in the lost volume of liquid nitrogen due to flash loss. Further, the thermodynamic efficiency of the cold trap of the invention is significantly enhanced by controlling the temperature of the cold trap by pressurizing the liquid nitrogen rather than using electric heating elements.

DESCRIPTION OF THE PREFERRED EMBODIMENT

Figure 1:
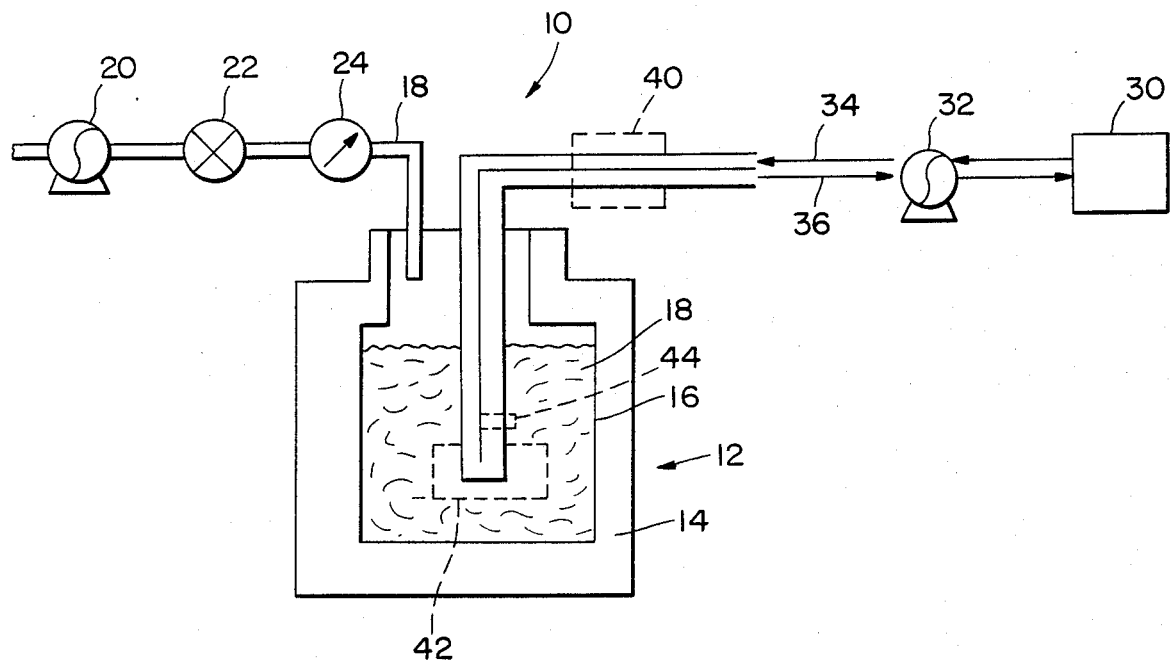
FIG. 1 is a schematic of a device embodying the invention.

Referring to the figure, a device illustrating the apparatus as shown generally at 10 comprises a Dewar vessel 12 having an evacuated inner liner 14 shielded from heat transfer. The inner liner 14 defines a pressure vessel 16. The vessel 16 is filled, usually more than 50% and generally about 80% of its volume, with liquid nitrogen. A pressure line 18 is received in the vessel in fluid tight relationship and communicates with a source of gas (not shown) such as nitrogen. A pump 20, regulator 22 and pressure indicator 24 all serve to control the pressure in the vessel 16. An excimer laser 30 is connected to a pump 32 and has outlet and inlet conduits 34 and 36 respectively.

As will be understood by those skilled in the art, the specific techniques for sealing the Dewar vessel 12 and the necessary connections to create pressure in the vessel 16 and any other associated valving, etc. necessary are well within the skill of the art and need not be described in detail.

Represented symbolically, 40 and 42 are heat exchange zones. Also shown schematically in the figure is a filter 44 through which the gas flows after the impurities have been frozen and while the impurities are frozen. The zone may simply be the conduits welded side to side or a specific heat exchanger may be used to ensure the gases flowing therethrough are in heat transfer relationship. That is, the specific structure used for the regenerative heat system, whether conduits joined together, alone or in combination with heat exchange units, will vary depending upon the type of gas being cleaned, its flow rate, temperature at which the liquid nitrogen must be maintained, the rate of heat transfer from the liquid nitrogen to the gas being cleaned, the rate of heat transfer between the gases, etc.

The invention will be described with reference to the following non-limiting example.

Figure 2:
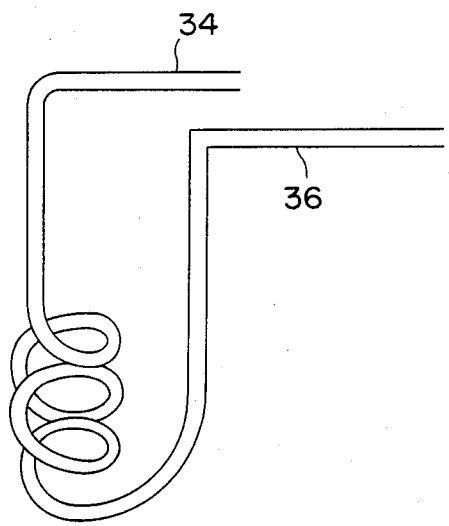
FIG. 2 is a schematic of a heat exchange zone.

The Dewar 12 holds a volume of approximately 50 liters of liquid nitrogen capable of being pressured to 100 to 235 psi as required. The laser gas circulating pump 32 is capable of operating at the laser gas pressures and is made of non-reactive materials. Further, the conduits are non-reactive and are high purity. The outlet 34 and inlet 36 conduits are received in the Dewar 12 in a fluid tight manner and they extend into the liquid nitrogen. The zone 42 could be a heat exchanger per se with the outlet conduit introducing gas and the inlet conduit carrying the discharged gas. More simply, the conduits 34 and 36 form a helix of any number of desired turns to define a heat exchange zone, as shown in FIG. 2.

Krypton fluoride flows from the laser 30 into the heat exchange zone 40 entering the zone at a temperature of about 28°C. This heat exchange zone, in combination with the other heat exchange characteristics of the system, is designed to ensure that the cleaned gas leaving the heat exchange zone 40 is also at about 28°C. The gas continues to flow through the outlet tube 34 and into the cold trap or liquid nitrogen. The gas may flow at a rate from 0.5 to 4.0 liters per minute, say for example 2 liters per minute. The vessel is pressurized to about 35 psig. This raises the boiling point of the liquid nitrogen to about −170° C. This temperature is sufficient to freeze the volatile impurities but not so cold as to liquify the laser gases. The impurities are removed by the filter 44. The gas flows through heat exchange zone 40 and back to the laser 30.

Thus, by controlling the boiling point of the liquid nitrogen as described in combination with the appropriate energy and materials balances, laser gases are easily purified.

In this disclosure there is shown and described preferred embodiments of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it, each as may be best suited in the condition of a particular case.

Having described my invention what I now claim is:

1. An apparatus for the purification of laser gases having impurities which comprises:
   a Dewar vessel adapted to hold liquid nitrogen therein;
   means to control the pressure of the nitrogen in the vessel and thereby the boiling point of the liquid nitrogen;
   means to flow the laser gas to be purified into heat exchange relationship with the liquid nitrogen at a temperature above the liquification temperature of the gas and below the liquification temperature of the impurities to freeze and to precipitate the impurities; and
   means to remove the impurities so precipitated.

2. The apparatus of claim 1 wherein the means to remove the impurities comprises a filter.

3. The apparatus of claim 1 wherein the means to introduce the gas and remove the gas comprises an outlet and an inlet received in the Dewar, which inlet and outlet extend into the liquid nitrogen.

4. A method for the purification of laser gases having impurities which includes:
   controlling the pressure of liquid nitrogen in a vessel and thereby the boiling point of the liquid nitrogen;
   flowing the laser gas to be purified into heat exchange relationship with the liquid nitrogen at a temperature above the liquification temperature of the gas and below the liquification temperature of the impurities;
   freezing the impurities;
   precipitating the impurities; and
   removing the impurities so formed.

5. The method of claim 4 wherein the impurities are halogens.

6. The method of claim 5 wherein the halogens are fluorine and chlorine.

7. The method of claim 4 wherein the laser gases are selected from the group consisting of argon fluoride, krypton fluoride and xenon chloride.

8. The method of claim 4 wherein the laser gas is krypton fluoride.

* * * * *